United States Patent [19]
Cain et al.

[11] Patent Number: 4,830,489
[45] Date of Patent: May 16, 1989

[54] THREE DIMENSIONAL LASER BEAM SURVEY SYSTEM

[75] Inventors: Gary L. Cain, New Carlisle; DuWain K. Ake, Huber Heights; Ted L. Teach, Dayton, all of Ohio

[73] Assignee: Spectra-Physics, Inc., San Jose, Calif.

[21] Appl. No.: 898,080

[22] Filed: Aug. 20, 1986

[51] Int. Cl.⁴ .................... G01B 11/14; G01B 11/26
[52] U.S. Cl. .......................... 356/73; 356/4; 356/152; 356/375; 356/400
[58] Field of Search ............ 356/375, 400, 4, 356/152, 73

[56] References Cited

U.S. PATENT DOCUMENTS

| | | | |
|---|---|---|---|
| 3,535,525 | 10/1970 | Minkowitz | 356/400 |
| 3,588,249 | 6/1971 | Studebaker | 356/4 |
| 3,751,169 | 8/1973 | Fornerod | 356/375 |
| 3,804,525 | 4/1974 | Caudill | 356/400 |
| 3,813,171 | 5/1974 | Teach et al. | 356/152 |
| 3,873,226 | 3/1975 | Teach | 404/84 |
| 3,894,230 | 7/1975 | Rorden et al. | 356/375 |
| 3,898,445 | 8/1975 | MacLeod et al. | 356/375 |
| 4,029,415 | 6/1977 | Johnson | 356/4 |
| 4,030,832 | 6/1977 | Rando et al. | 356/152 |
| 4,471,530 | 9/1984 | Kirven | 33/174 |
| 4,729,660 | 3/1988 | Tsumura et al. | 356/375 |

FOREIGN PATENT DOCUMENTS

2173369 10/1986 United Kingdom ............... 356/375

*Primary Examiner*—F. L. Evans
*Attorney, Agent, or Firm*—Quarles & Brady

[57] ABSTRACT

A laser beam alignment system includes a transmitter which establishes a laser reference plane by continuously rotating a horizontal laser beam about the transmitter. A remotely located receiver senses the elevation of the laser reference plane and reflects a portion of the laser energy back to the transmitter where the reflected energy is employed to produce a signal indicative of the range of the receiver and its location with respect to a reference axis. The position of the receiver is thus established in three dimensions.

7 Claims, 6 Drawing Sheets

THREE DIMENSIONAL LASER BEAM SURVEY SYSTEM

BACKGROUND OF THE INVENTION

The field of the invention is laser-based alignment equipment, and particularly, systems which produce an alignment field using a laser transmitter and one or more receivers which detect the alignment field and provide an accurate alignment indication at locations remote from the laser transmitter.

In prior laser-based alignment systems, such as that disclosed in U.S. Pat. No. 3,588,249, for example, a reference plane is established throughout a work site by a transmitter which emits laser energy in a level reference plane. This reference plane is typically established by a beam which is projected radially outward from the transmitter and rotated continuously through 360 degrees to sweep around the entire work site. One or more receivers may be employed throughout the Work site to sense the location of this reference plane. Such receivers may be employed as part of a surveyor rod as described in U.S. Pat. No. 4,030,832, or they may be employed as part of a control system on construction or agricultural equipment as described in U.S. Pat. Nos. 3,813,171; 3,873,226; 3,997,071; and 4,034,490.

Prior laser alignment systems provide an indication of elevation throughout the work site, but they do not indicate the position of the receiver within the work site. Thus, for example, the blade on a load grader can be automatically controlled to a desired elevation by such prior systems, but it is up to the operator to determine where the road grader is located and what the elevation should be at that location.

In other words, prior laser alignment systems provide only one dimension of position information-elevation.

SUMMARY OF THE INVENTION

The present invention relates to a laser alignment system which provides not only elevation information at a work site, but also, position information. More particularly, the present invention includes a laser transmitter which is located at a reference position in the work site and which emits laser energy radially outward in a reference plane, and a receiver Which includes a sensor that determines the elevation of the laser reference plane and which includes a reflector that reflects laser energy back to the transmitter. The laser transmitter further includes a sensor for receiving the reflected laser energy and in response thereto producing receiver position information which is transmitted back to the receiver. The receiver thus obtains information which indicates its position in three dimensions.

A general object of the invention is to provide three dimensional position information throughout a work site. The receiver may be moved throughout the work site anywhere within the range of the laser transmitter. The receiver senses the elevation of the laser reference plane directly and thus provides one axis of position information to an operator, or to an automatic control system. In addition, the receiver obtains information from the laser transmitter which indicates the receiver's position with respect of a reference point at the work site. These additional two dimensions of position information may also be displayed to an operator or applied as inputs to an automatic control system.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

GENERAL DESCRIPTION OF THE INVENTION

Figure 1:
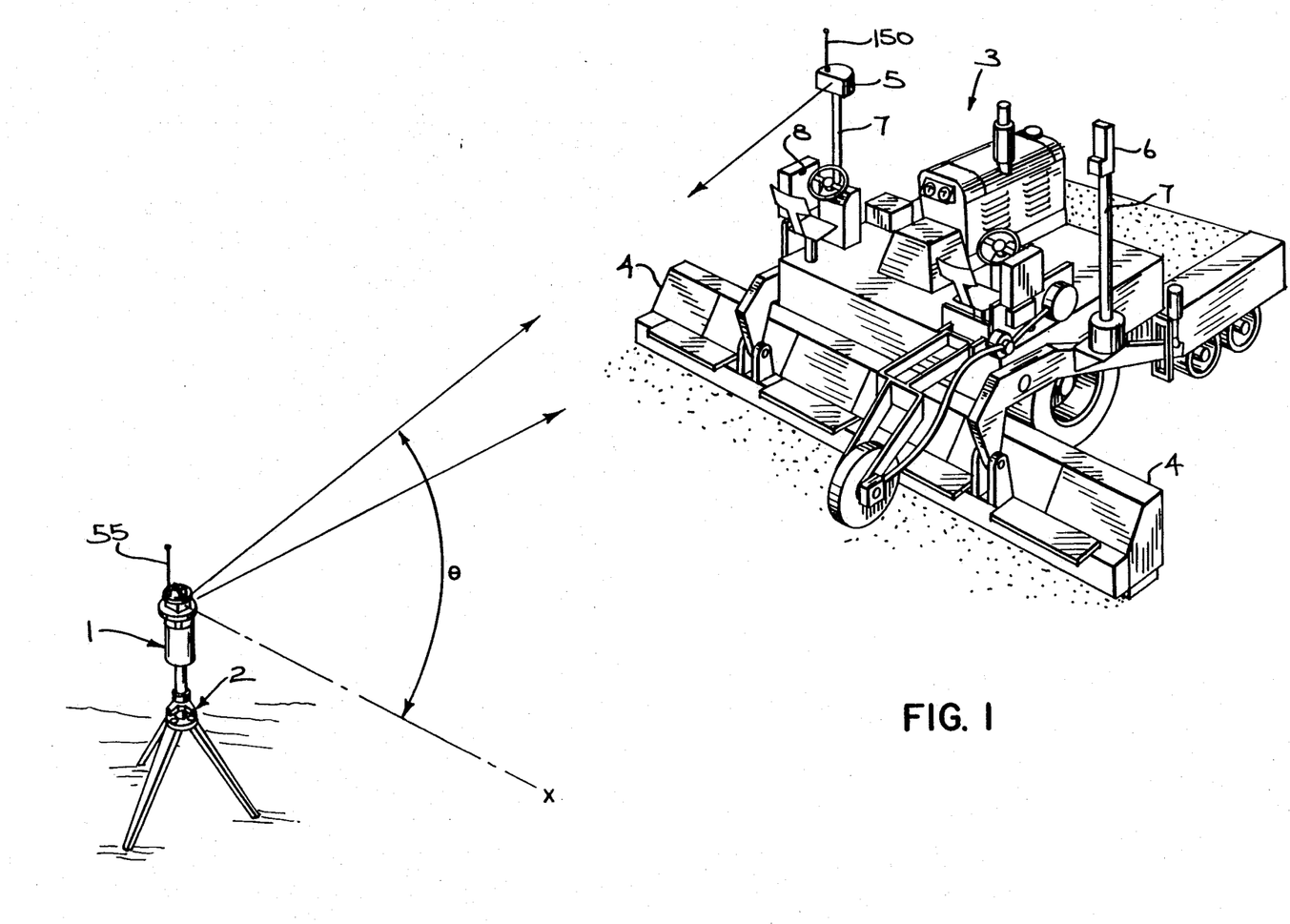
FIG. 1 is a pictoral view of a work site showing a laser transmitter and a receiver mounted to a road paving machine which employs the present invention.

Referring to FIG. 1, a laser transmitter 1 is mounted to a tripod 2 that is situated at a reference point in a work site. In the example shown, the work site might be a large parking lot, an air field or other surface which is to be paved at a specified grade by a paving machine 3. The paving machine 3 moves about the work site depositing the paving material at a thickness which will bring the top surface up to a desired grade. It can be appreciated that while such pavement is substantially level, it usually will be slightly contoured in order to properly channel run-off from rain storms. Such contouring is specified on a topographic plan as elevations at specified positions throughout the site.

The paving machine 3 is equipped with a control system for automatically maintaining each end of a distributor 4 at a desired elevation with respect to a laser reference plane produced by the laser transmitter 1. Such a control system is described in U.S. Pat. No. 3,873,226 entitled "Laser Beam Control System For Road Paving Machines" and it is responsive to signals produced by two laser receivers 5 and 6 mounted on each side of the paving machine 3. The receiver 6 is of conventional design and is supported by a mast 7 that moves the receiver 6 up and down to maintain its photo detectors in the horizontal laser reference plane despite the up and down motions of the paving machine 3.

As described in the above-cited U.S. Pat. No. 3,873,226, the control system also raises and lowers the spreader 4 to maintain the top surface of the pavement at a desired elevation despite the unevenness of the ground on which the paving machine operates. As will be described in more detail below, the receiver 5 on the other side of the paving machine 3 performs the same function of providing elevation information to the control system, but it also provides information which indicates the position of the paving machine with respect to the laser transmitter 1. This information is displayed on an operator panel 8 located adjacent to the operator.

Figure 2A:
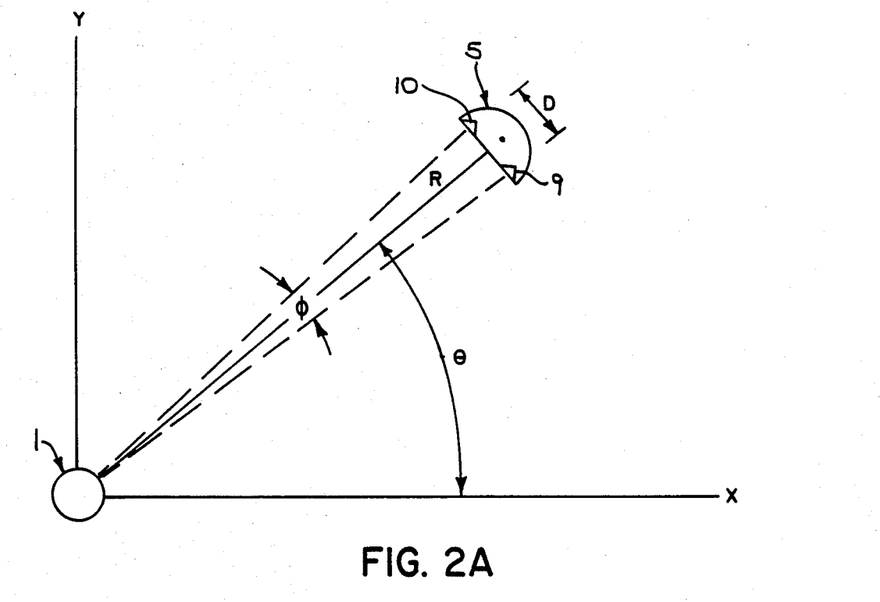
FIGS. 2A and 2B are graphic illustrations which are employed to explain the method of the present invention.

Referring particularly to FIGS. 1 and 2A, the transmitter 1 produces a beam of laser energy which is projected radially outward therefrom. This beam is continuously rotated through 360 degrees at a constant angular velocity and it sweeps past each receiver 5 and 6 once during each revolution. A horizontal reference axis, X, is established and the position of the receiver 5 with respect to this X axis is calculated by measuring the angle $\theta$. As will be described in more detail below, the reference axis X is established by reflecting the laser beam back into the transmitter 1 when the beam is oriented along the X axis. This reflected energy is sensed by a photodetector inside the transmitter 1 which produces an electrical pulse.

Figure 2B:
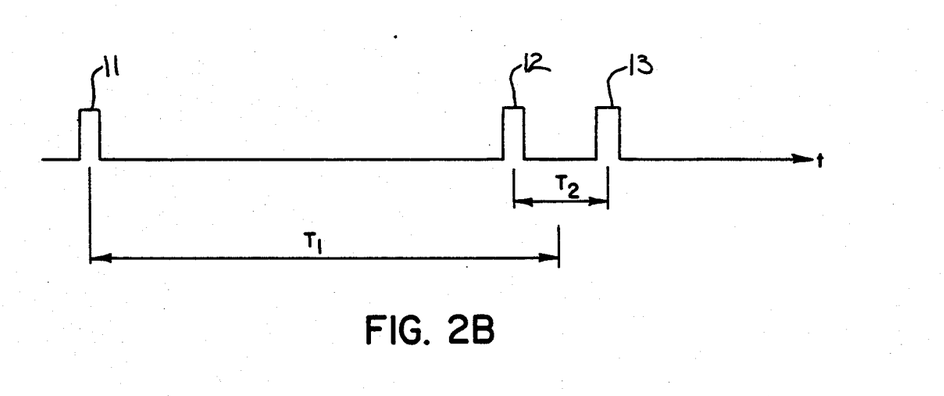

Similarly, the angular position $\theta$ of the receiver 5 is determined by reflecting laser energy back into the transmitter 1 from the receiver 5. This is accomplished by a pair of spaced, retroreflectors 9 and 10 mounted inside the receiver 5. Referring particularly to FIGS. 2A and 2B, during each revolution of the laser beam, three electrical pulses are thus produced by the photodetector in the transmitter 1. The reference pulse 11 is produced when the laser beam is oriented along the X axis, and two closely spaced pulses 12 and 13 are produced when the beam sweeps past the receiver 5. Because the beam is swept at a constant angular velocity w, the time period $T_1$ between these pulses can be employed to calculate the angle $\theta$.

In addition, the time period $T_2$ between the two pulses 12 and 13 produced by the reflections from the receiver 5 can be used to calculate the range, or distance R, of the receiver 5 from the transmitter 1.

$$\phi = WT_2$$

$$R = \frac{D}{2 \tan(\phi/2)}$$

where:
$D$ = the spacing between the two reflectors 9 and 10 in the receiver 5.

where: D=the spacing between the two reflectors 9 and 10 in the receiver 5.

This position information is conveyed from the transmitter 1 to the receiver 5 where it is combined with the elevation information gathered directly by the receiver 5 in the conventional manner. A three dimensional position of the paving machine is thus established and can be displayed and/or employed to control the elevation of the spreader 4.

It should be apparent that there are a number of variations possible in the above-described method. For example, a rotary position encoder can be coupled to rotate with the laser beam and the angle $\theta$ may be read from this encoder when a reflective pulse is received from the receiver 5. Also, the range R can be measured by modulating the laser beam and measuring the phase shift which occurs between the modulating signal and the signal which results from demodulating the reflected laser energy.

DESCRIPTION OF THE PREFERRED EMBODIMENT

Figures 3A, 3B:
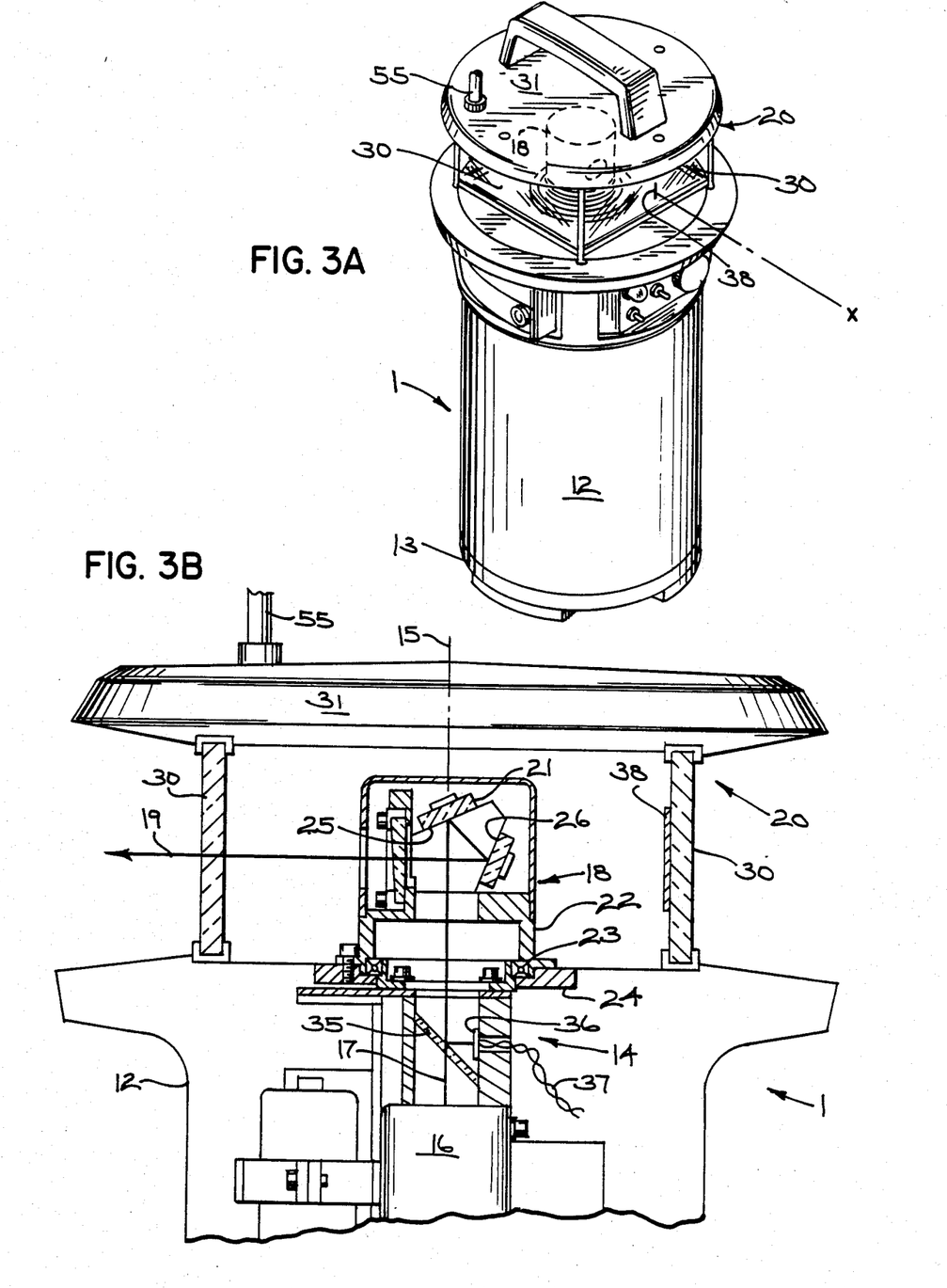
FIG. 3A is a perspective view of the laser transmitter employed in the system of FIG. 1.
FIG. 3B is a partial view with parts cut away of the laser transmitter of FIG. 3A.

Referring particularly to FIGS. 3A and 3B, the laser transmitter 1 includes a cylindrical housing 12 which provides a sealed, water-tight enclosure for internal components. A base plate 13 is attached to the bottom of the housing 12, and it is adapted for attachment onto a suitable trivet or tripod 2.

A laser beam projector 14 is mounted within the housing 12 by a gimbal frame (not shown) which enables it to be positioned along a vertical, Z axis 15. The laser beam projector 14 includes a tubular body 16 which extends downward into the housing 12 and a laser tube (not shown) is mounted at its lower end. The laser tube contains a suitable active gas such as a helium-neon gas which produces a low-powered collimated output beam in the red band of the light spectrum. Optics are provided at the bottom of the tubular body 16 for routing the laser beam upward along the Z axis 15. This output beam is indicated at 17 in FIG. 3B.

The collimated laser beam 17 passes upwardly through the open end of the tubular body 16 into a pentaprism reflecting head 18. The head 18 projects the beam radially outward along the horizontal path 19 through a lighthouse structure 20 formed on top of the housing 12. The reflecting head 18 comprises a pentaprism assembly 21 mounted on a platform 22 which in turn is mounted by bearings 23 for rotation about the Z axis 15. A drive pulley 24 is bolted to a flange on the bottom of the platform 22 and it is rotated at a constant angular velocity (w) by an electric motor (not shown) mounted within the housing 12. The pentaprism assembly 21 includes a pair of mirrors 25 and 26 which are precisely mounted to reflect the laser beam a total of ninety degrees. As the reflector head 18 rotates, the laser beam 19 is swept through 360 degrees to define a horizontal reference plane that extends radially outward in all directions from the transmitter 1.

The lighthouse assembly 20 provides watertight enclosure for the rotating reflector head 18. It includes a set of four upstanding transparent panes 30 which are joined together at their side edges. Preferably the panes 30 are formed from flat optical glass which have their surfaces covered with a suitable anti-reflective coating. A cover 31 is mounted on top of the panes 30 to fully enclose the reflector head 18 and to hold the upper edges of the panes 30 in place.

The transmitter 1 described thus far is one which has been in commercial use for many years and which is described in great detail in U.S. Pat. No. 4,062,634 which is incorporated herein by reference.

Referring still to FIGS. 3A and 3B, the transmitter 1 required to implement the preferred embodiment of the present invention is a modified version of this conventional device. First, a beam splitter 35 has been mounted within the tubular body 16 near its upper end. The beam splitter 35 is mounted at a 45 degree angle and it enables the laser beam 17 to pass upward through it with minimal loss. However, laser energy which is reflected back and passes down into the tubular body 16 is reflected by the beam splitter 35 against the inner wall of the body 16. A photodetector 36 is mounted to the inner wall at this point an a pair of attached wires 37 extend through an opening in the tubular body 16 to an electronic circuit mounted within the housing 12. When reflected laser energy enters the transmitter 1, therefore, a current is produced in the wires 37.

Another modification to the transmitter 1 is the addition of a reflective strip 38 to the inner surface of one of the panes 30 in the lighthouse 20. This reflective strip 38 is in the path of the laser beam 19, and as the beam 19 is rotated past the reflective strip 38, a pulse of laser energy is reflected back into the reflecting head 18 to produce a corresponding current pulse in the wires 37. The reflector strip 38 defines the horizontal reference axis X and the resulting current pulse indicates when the laser beam is oriented along the reference axis X.

Referring particularly to FIG. 2B, the photodetector 36 within the transmitter 1 produces a current pulse whenever laser energy is reflected back to the transmitter 1. Thus, not only is the reference pulse 11 produced by a reflection from the reflector strip 38, but the two pulses 12 and 33 are produced by reflections from the receiver 5. This information is conveyed to th circuitry inside the housing 12 which is shown schematically in FIG. 5.

Figure 5:
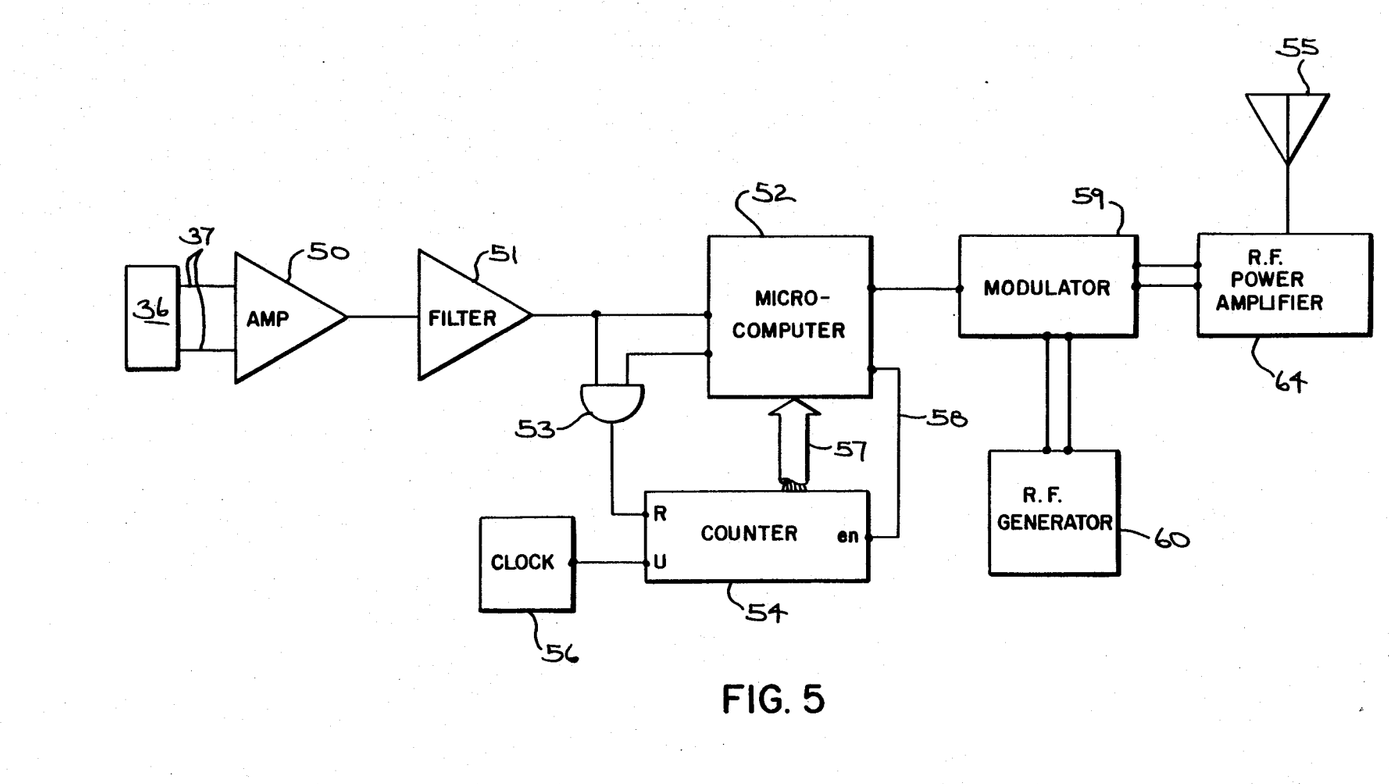
FIG. 5 is an electrical block diagram of the circuit employed in the laser transmitter of FIG. 3A.

Referring to FIG. 5, the current pulses from the photodetector 36 are amplified at 50 and then filtered at 51. The filter 51 is a low-pass filter which eliminates noise from the amplified photodetector signal and applies the resulting signal to the input of a microcomputer 52. The photodetector signal is also applied to one input of an AND gate 53 which has a second input driven by an output on the microcomputer 52 and an output which connects to a reset terminal on a binary counter 54. A clock 56 connects to the up-count terminal on the counter 54 to continuously increment the binary number stored therein. The binary number stored in the counter 54 is read into the microcomputer 52 through a bus 57 when the microcomputer 52 activates an enable terminal through a control line 58.

The microcomputer 52 stores a short program which enables it to convert the intervals between pulses from the photodetector 36 into digital numbers and to transmit those numbers in serial form to a modulator 59. More specifically, when the reference pulse 11 (FIG. 2B) is produced, the counter 54 is reset to zero by the enabled AND gate 53. The counter 54 is incremented and the count is read by the microcomputer 52 when the successive pulses 12 and 13 are sensed by the photodetector 36. The periods $T_1$ and $T_2$ can be easily calculated from the resulting stored binary numbers and the known frequency of the clock 56, or in the alternative, the numbers can be converted to ratios by dividing them by the total count for a complete revolution of the laser beam. In any case, the numbers are output to the modulator 59 in serial form. The modulator 59 also receives a radio frequency signal of constant amplitude and frequency from an r.f. generator 60, and it produces bursts of radio frequency energy which are digital representations of the numbers. These are amplified by an r.f. power amplifier 64 and coupled to an antenna 55 which is mounted on top of the transmitter 1. The bursts of r.f. energy are thus propagated throughout the work site where they can be detected by receivers 5 as will be discussed in more detail below.

Figure 4A:
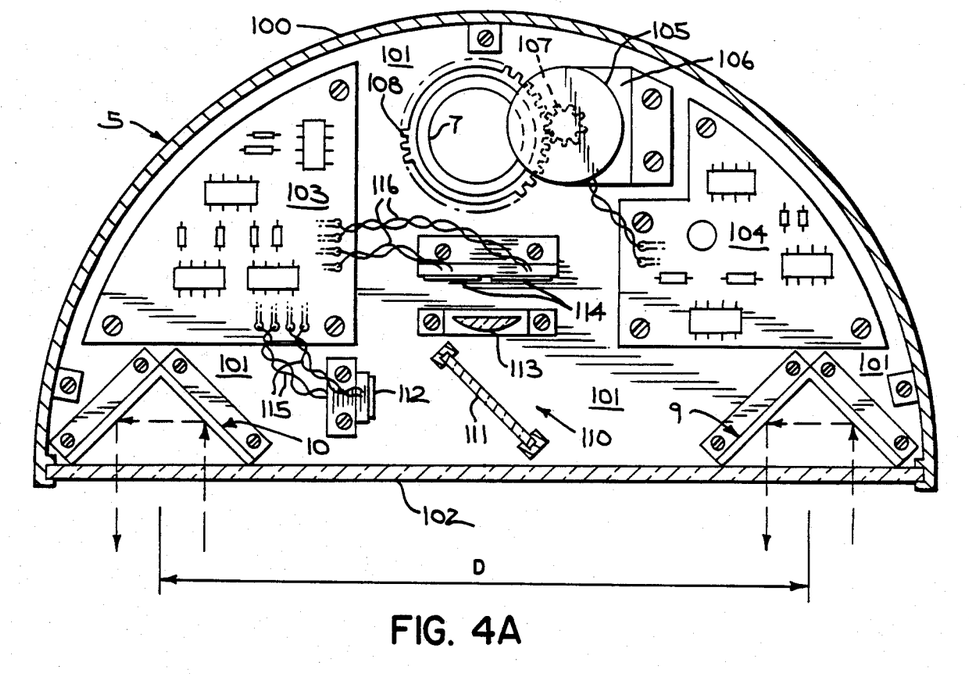
FIG. 4A is a top view with parts cut away of the receiver which forms part of the system of FIG. 1.

Referring particularly to FIG. 4A, the receiver 5 includes a semi-cylindrical housing 100 which is weather tight and which provides protection for the optical and electrical components contained therein. The housing 100 is formed from cast aluminum parts and it is rotatably mounted to the mast 7 which extends upward through an opening in the bottom 101 of the housing 100. A flat, transparent window 102 is fastened to the housing 100 and a pair of printed circuit boards 103 and 104 are mounted to the bottom 101 on either side of the mast 7.

Referring still to FIG. 4A, an electric motor 105 is mounted to the housing 100 by a bracket 106. As will be described in more detail below, the electric motor 105 is operated by the circuitry on board 104 to rotate a drive gear 107 in either direction. The drive gear 107 engages a driven gear 108 which is disposed around the mast 7 and securely fastened to it. As the motor 105 is operated, therefore, the housing 100 is caused to rotate about the mast 7 to direct its transparent window 102 toward the transmitter 1.

The laser energy which enters the receiver 5 through the window 102 impinges on the corner cubes 9 and 10 which are mounted to the bottom 101 and positioned for maximum lateral spacing (D). As is well-known in the art, corner cubes 9 and 10 include a pair of mirrored surfaces which reflect the impinging laser energy back to its source, the transmitter 1.

Figure 4B:
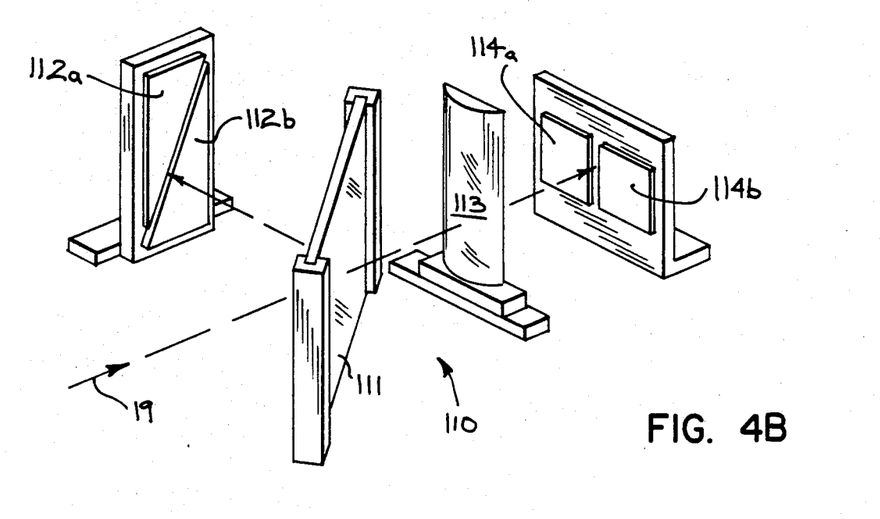
FIG. 4B is a partial perspective view showing the optical path and photodetectors in the receiver of FIG. 4A.

To control the height and orientation of the receiver 5, the incident laser energy from the transmitter 1 also impinges on an alignment system indicated generally in FIG. 4A at 110 and shown in perspective in FIG. 4B. This alignment system 110 includes a beam splitter 111 which is mounted vertically and at an angle to the incident laser beam 19. A portion of the laser energy is reflected off its front surface and impinges on a pair of triangular photodetectors 112. The remainder of the laser energy passes through the beam splitter 111, through an upright cylindrical lens 113, and impinges on a pair of butted photodetectors 114. All four photodetectors 112 an 114 are connected through wires 115 and 116 to the printed circuit board 103. As will be described below, the currents produced by the photodetectors 112 and 113 are employed to control the motor 105 and a mast motor (not shown) which is housed at the base of the mast 7.

As shown best in FIG. 4B, the photodetectors 112 produce signals which control receiver height. When the receiver is below the laser beam 19, more of the energy impinges on the upper photodetector 112a and it produces more current than the lower detector 112b because of the triangular shape of each. This difference is employed to produce a control signal which raises the mast 7 to bring the receiver back into alignment with the laser beam 19.

Similarly, the photodetectors 114 produce signals with control receiver orientation, or azimuth. The cylindrical lens 113 converts the substantially circular laser beam into a vertical line of laser energy. When the receiver 5 is pointing directly at the transmitter, this line is positioned at the juncture of the left photodetector 114a and the right photodetector 114b and they produce equal currents. This line translates to one photodetector or the other when the receiver becomes misaligned and the resulting difference in currents produced by the photodetectors 114a and 114b is employed to produce a motor control signal which brings the receiver 5 back into alignment.

Figure 6:
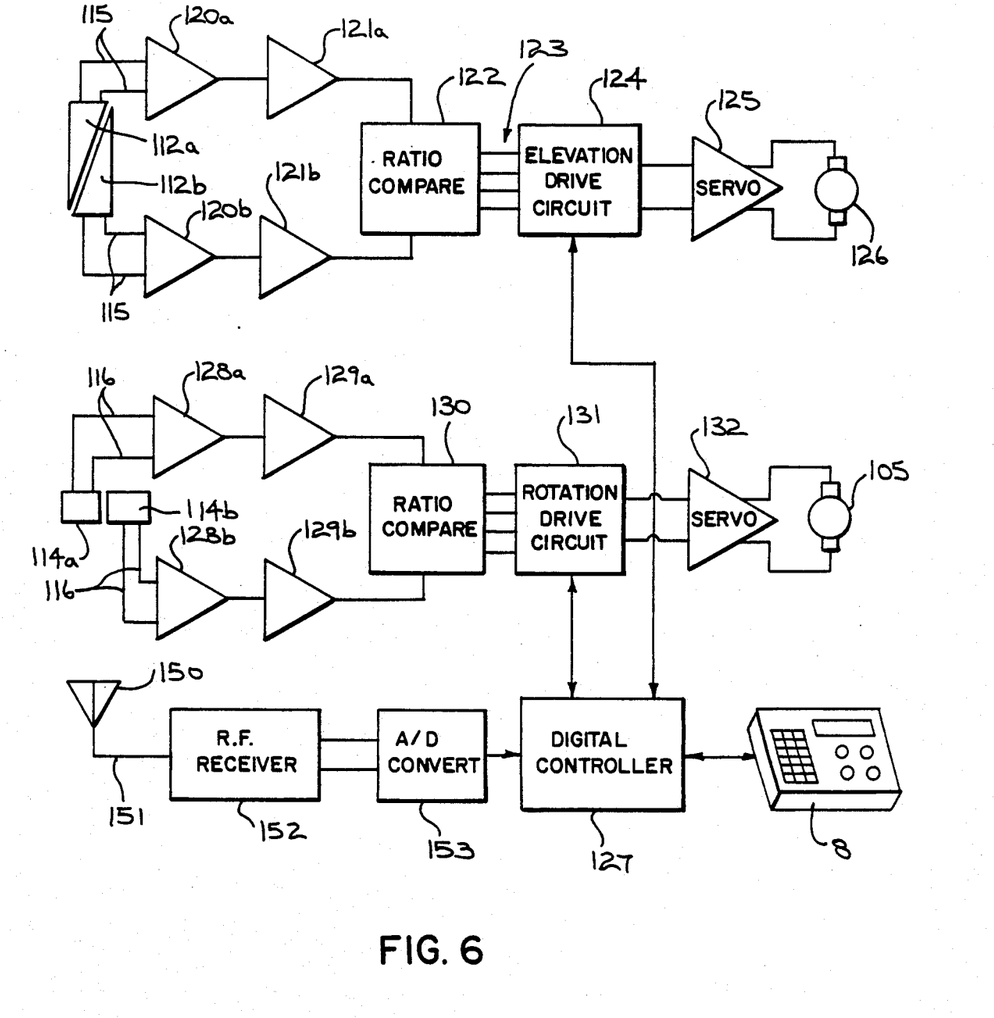
FIG. 6 is an electrical block diagram of the circuit employed in the receiver and road paving machine of FIG. 1.

Referring particularly to FIG. 6, the electronics for controlling the orientation of the receiver 5 is contained primarily in the receiver housing 100. The wires 115 from the photodetectors 112a and 112b connect to respective filters 120a and 120b and the filtered signals are applied to respective amplifiers 121a and 121b. The signals produced by the amplifiers 121a and 121b are applied to two inputs of a ratio comparator 122. The ratio comparator 122 determines the vertical position of the receiver 5 relative to the laser reference beam and produces a corresponding logic level signal on one of four output lines 123. Two of the lines 123 indicate the receiver 5 is above the beam and two indicate it is below the beam. No signal indicates that the receiver 5 is "ON" the reference beam or that the reference beam is out of the range of the photodetectors 112.

The signals produced by the ratio comparator 122 are applied to an elevation drive circuit 124. The drive circuit 124 produces an appropriate motion command signal to a servo amplifier 125, which in turn energizes the motor 126 that raises or lowers the mast 7 which supports the receiver 5. The elevation drive circuit 124 is also coupled to communicate with a digital controller 127. The digital controller 127 connects to the operator control panel 8 and it inputs elevation information from the elevation drive circuit 124 and adds an offset to that number to provide the elevation of the spreader 4 on the paving machine. The digital controller 127 also receives manual input data from the operator panel 8 which is applied to the elevation drive circuit 124 to manually move the receiver 5 up or down when the system is in the "MANUAL" mode.

The above-described circuitry for elevation alignment is well-known in the art and it is commercially available in a number of forms. Such circuitry is shown, for example, in U.S. Pat. No. 4,030,832; co-pending U.S. patent application Ser. No. 788,764, filed on Oct. 18, 1985, and entitled "Laser Alignment System with Modulated Field"; and co-pending U.S. patent application Ser. No. 885,440, filed on July 14, 1986 and entitled "Multi-Axis Elevation Control System for Earth Moving Equipment".

Referring still to FIG. 6, the rotational alignment of the receiver 5 with respect to the reference laser beam is accomplished in substantially the same manner. The output of each photodetector 114a and 114b is applied to respective filters 128a and 128b, and the filtered signals are applied to respective amplifiers 129a and 129b. The relative magnitudes of the two resulting signals are weighed at a ratio comparator 130, and an appropriate motion command signal is produced by a rotation drive circuit 131. The motion command signal is applied to a servo amplifier 132 which drives the motor 105 to rotate the receiver 5 back into alignment with the transmitter 1. The rotation drive circuit 131 is also coupled to the digital controller 127 and the rotation of the receiver 5 can also be manually controlled through the operator panel 8.

In addition to receiving the laser energy from the transmitter 1, the receiver 5 also receives the bursts of radio frequency energy which are transmitted throughout the work site. Referring particularly to FIGS. 1 and 6, an antenna 150 is mounted on top of the receiver 5 and is coupled through a line 151 to the input of a radio frequency receiver 152. The r.f. receiver 152 filters out unwanted r.f. signals and noise. It also amplifies the desired r.f. signal and demodulates the same to reconstruct the pulse sequence produced at the transmitter 1 and illustrated in FIG. 2B.

The demodulated r.f. signal is then applied to an analog to digital converter 153 which measures the time interval between received r.f. pulses and converts each time interval to a binary number. These digitized time intervals are input to the digital controller 127 and stored in tables formed in a random access memory (not shown). The digital controller 127 is programmed to read these time intervals and perform the calculations described above to convert them into a three dimensional machine position. This position information is output to the operator panel 8 to provide a continuous visual indication of the location of the road paving machine 3.

I claim:

1. In a laser beam alignment system having a transmitter which produces a laser reference plane by sweeping a laser beam about the transmitter and a receiver which senses the location of the laser reference plane, the improvement therein comprising:
   axis reference means at said transmitter for providing a signal which indicates when the laser beam is swept through a reference axis;
   reflector means at the receiver for reflecting laser energy in the laser beam back to the transmitter when the laser beam sweeps past the receiver;
   detector means at the transmitter for producing an electrical signal in response to the laser energy reflected back from the receiver;
   azimuth means coupled to the detector means for producing an electrical signal indicative of the angle at which the receiver is positioned with respect to the reference axis; and
   range means coupled to the detector means for producing an electrical signal indicative of the distance of the receiver from the transmitter.

2. The improvement as recited in claim 1 in which the transmitter includes means for sending the angle and distance information indicated by said signals to the receiver, and the receiver includes means for receiving the range and angle information.

3. The improvement as recited in claim 1 in which the axis reference means includes a reflector which is positioned on the reference axis to reflect laser energy back to the detector means when the laser beam is swept through the reference axis.

4. The improvement as recited in claim 3 in which the electrical signal produced by the azimuth means is a pair of pulses produced by the reflections from the axis reference means and the receiver respectively, and the angle information is indicated by the time interval between said pair of pulses.

5. The improvement as recited in claim 1 in which the reflector means at the receiver includes two reflectors which are spaced apart and directed towards the transmitter to produce two distinct pulses of reflected laser energy, and the electrical signal produced by the range means at the transmitter indicates the distance of the receiver from the transmitter by the time interval said two distinct pulses of reflected laser energy.

6. A laser alignment system having a transmitter which produces a laser reference plane and a receiver which senses the location of the laser reference plane, the improvement therein comprising:
   azimuth means at said transmitter for providing an electrical signal indicative of the angle at which the receiver is positioned with respect to a reference axis that extends from the transmitter;
   reflection means at the receiver for reflecting laser energy back to the transmitter;
   range means at the transmitter for receiving laser energy reflected from the receiver and producing an electrical signal indicative of the distance of the receiver from the transmitter; and
   means at the transmitter for receiving the azimuth and range signals and transmitting the azimuth and range information to the receiver.

7. The improvement as recited in claim 6 in which the receiver includes means for receiving the range and azimuth information from the transmitter; and means for displaying said information.

* * * * *